United States Patent
Frerichs et al.

(10) Patent No.: US 7,225,109 B2
(45) Date of Patent: *May 29, 2007

(54) METHOD AND APPARATUS TO DIAGNOSE MECHANICAL PROBLEMS IN MACHINERY

(75) Inventors: Donald Karl Frerichs, Shaker Hts., OH (US); Frank Marvin Toth, Mentor, OH (US); Steven James Johnson, Punta Gorda, FL (US)

(73) Assignee: ABB Inc., Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/034,651

(22) Filed: Jan. 13, 2005

(65) Prior Publication Data

US 2005/0154542 A1    Jul. 14, 2005

Related U.S. Application Data

(60) Provisional application No. 60/536,356, filed on Jan. 14, 2004.

(51) Int. Cl.
G06F 11/30 (2006.01)
G06F 17/18 (2006.01)

(52) U.S. Cl. ............ 702/185; 702/179; 702/56; 73/570

(58) Field of Classification Search ........... 702/33–45, 702/56, 179–185; 706/913–915; 73/570
See application file for complete search history.

(56) References Cited

U.S. PATENT DOCUMENTS

| | | | | |
|---|---|---|---|---|
| 4,980,844 A | * | 12/1990 | Demjanenko et al. | 702/56 |
| 5,402,521 A | * | 3/1995 | Niida et al. | 706/20 |
| 5,602,761 A | | 2/1997 | Spoerre et al. | |
| 6,502,018 B1 | * | 12/2002 | Bessler | 701/29 |
| 6,574,613 B1 | | 6/2003 | Moreno-Barragan | |
| 6,643,799 B1 | | 11/2003 | Bonissone et al. | |
| 6,898,554 B2 | * | 5/2005 | Jaw et al. | 702/185 |
| 2002/0087290 A1 | * | 7/2002 | Wegerich et al. | 702/182 |
| 2003/0074169 A1 | * | 4/2003 | Vanderwiel | 703/6 |
| 2005/0096757 A1 | * | 5/2005 | Frerichs et al. | 700/21 |
| 2005/0187649 A1 | * | 8/2005 | Funk et al. | 700/121 |

FOREIGN PATENT DOCUMENTS

| | | |
|---|---|---|
| DE | 19630694 | 9/1997 |
| EP | 10281925 | 10/1998 |
| WO | WO 2005/001124 | 1/2005 |

* cited by examiner

*Primary Examiner*—Manuel L. Barbee
(74) *Attorney, Agent, or Firm*—Michael M. Rickin; Paul R. Katterle

(57) ABSTRACT

A method and apparatus for detecting mechanical problems in machinery used in a process. A model of the process is developed using a modeling technique such as advanced pattern recognition and the model is used to generate predicted values for a predetermined number of the operating parameters of the process and vibration parameters of the machinery. Statistical process control methods are used to determine if the difference between the predicted and actual measured values for one or more of the parameters exceeds a configured statistical limit. A rule set is used to indicate an actual or probable fault in the machinery.

18 Claims, 3 Drawing Sheets

Figure 1 – Typical Process

Figure 2 - Methodology

METHOD AND APPARATUS TO DIAGNOSE MECHANICAL PROBLEMS IN MACHINERY

CROSS REFERENCE TO RELATED APPLICATION

This application claims the priority of U.S. provisional patent application Ser. No. 60/536,356 filed on Jan. 14, 2004, entitled "A Method To Diagnose The Onset Of Mechanical Problems In Rotating Equipment" the contents of which are relied upon and incorporated herein by reference in their entirety, and the benefit of priority under 35 U.S.C. 119(e) is hereby claimed.

FIELD OF THE INVENTION

This invention relates to machinery and more particularly to the diagnosis of problems in such equipment.

DESCRIPTION OF THE PRIOR ART

High-valued complex machinery often constitutes a major investment to its owner and is not easily replaced. Examples include consumer items such as automobiles and farm equipment, heavy equipment such as trains, cranes, drills and earthmovers, as well as special purpose factory installations such as power generators, assembly line equipment, and power train equipment, such as transmissions, for delivering power to assembly line equipment. Owners of such machinery desire to detect and correct small problems with individual components of such machinery before the small problem leads to catastrophic failure of the machine. However, it is often impractical to inspect each small component subject to failure on a frequent basis. The component may be buried deep in the machinery and require many person-hours to remove, inspect and re-install or replace. In addition to the costs of the person-hours, there is the cost of having the high-valued equipment non-operational for the duration of the inspection procedure. Such costs are only warranted when the part is sufficiently defective that failure to replace may lead to failure of the high-valued complex machine of which it is part.

There is a clear need for systems that can monitor the high-valued complex machinery for failure of individual components while the machinery is operating for its intended purpose.

One approach is to build-in special purpose sensors that detect the correct operation of each individual component, and have those sensors report when the associated component fails. This approach is impractical for many reasons and is not taken in practice. In many machines, there are so many moving components, some very small, that special purpose sensors attached to each one may interfere with required motions, violate required spatial tolerances, increase the cost of the machinery, and otherwise render the machinery unsuitable for its purpose. Another problem with this approach is that some failure modes are not determined until after the machine is built and operated, and it is impossible to guarantee a sensor that will detect such failure modes before they are discovered.

Another approach is to attach vibration sensors to the machinery and analyze vibration data from such sensors. Changes in operation of one or more components of the machinery associated with failure of that component may change one or more characteristics of the vibration data. This approach has been taken by many conventional systems. However, the changes that can be detected depend on the characteristics of the vibration data and the processing of the vibration data.

Some conventional systems process vibration data by measuring the shape and size of vibration amplitude with time. Such systems have been used to determine gross transient properties of machinery, such as a catastrophic bearing failure, or approach of a train on train rails. However, such systems have not been shown to detect small changes in minor components of the machinery. Such small changes are often dwarfed by the vibrations caused by larger, more energetic components, such as drive shafts.

Some systems process vibration data by determining statistics of the vibration in the frequency domain. However, such systems have not been shown to detect small changes in minor components of complex machinery. Such small changes are often dwarfed by the vibrations caused by larger, more energetic components, in the same frequency band. Some small components may vary their frequency signature with time during normal operations, so that it is difficult, using fixed frequency bands, to distinguish normal variations from variations associated with an approaching failure of a minor component.

Based on the foregoing, there is a clear need for a machinery monitoring system that can detect problems in minor components of complex machines, which warrant maintenance actions directed to those minor components.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

Some examples of the approaches used in the prior art are described in U.S. Pat. Nos. 6,643,799; 6,574,613 and 6,502,018.

Two of the three named inventors herein are also the inventors in U.S. patent application Ser. No. 10/962,150 entitled "Method and Apparatus for Detecting Faults In Steam Generator System Components and Other Continuous Processes" having a filing date of Oct. 7, 2004.

SUMMARY OF THE INVENTION

A method for detecting a fault in a machine used in a process. The method has the steps of:

developing a model of the process;

generating predicted values for a predetermined number of operating parameters of the process and a predetermined number of vibration parameters of the machine using the model;

comparing the value predicted by the model for each of the predetermined number of vibration and operating parameters to a corresponding actual measured value for each of the vibration and operating parameters; and determining whether differences between the predicted and actual measured values for one or more of the predetermined number of vibration and operating parameters exceeds a configured statistical limit using numerical methods.

A process plant that has:

a computing device for detecting a fault in a machine used in a process operating in the plant, the computing device for developing a model of the process;

generating predicted values for a predetermined number of operating parameters of the process and a predetermined number of vibration parameters of the machine using the model;

comparing the value predicted by the model for each of the predetermined number of vibration and operating parameters to a corresponding actual measured value for each of the vibration and operating parameters; and determining whether differences between the predicted and actual measured values for one or more of the predetermined number of vibration and operating parameters exceeds a configured statistical limit using numerical methods.

In a plant that has:
a process having one or more machines;
a computing device for detecting a fault in the one or more machines of the process, the computing device for developing a model of the process;

generating predicted values for a predetermined number of operating parameters of the process and a predetermined number of vibration parameters of the one or more machines using the model;

comparing the value predicted by the model for each of the predetermined number of vibration and operating parameters to a corresponding actual measured value for each of the vibration and operating parameters; and determining whether differences between the predicted and actual measured values for one or more of the predetermined number of vibration and operating parameters exceeds a configured statistical limit using numerical methods.

A computer readable medium having instructions for performing a method for detecting a fault in a machine of a process operating in a plant, the instructions are for:
developing a model of the process;
generating predicted values for a predetermined number of operating parameters of the process and for a predetermined number of vibration parameters of the machine using the model;

comparing the value predicted by the model for each of the predetermined number of vibration and operating parameters to a corresponding actual measured value for each of the vibration and operating parameters; and determining whether differences between the predicted and actual measured values for one or more of the predetermined number of vibration and operating parameters exceeds a configured statistical limit using numerical methods.

An apparatus that has:
a processing device for:
developing a model of a process;

generating predicted values for a predetermined number of operating parameters of the process and a predetermined number of vibration parameters of the machine using the model;

comparing the value predicted by the model for each of the predetermined number of vibration and operating parameters to a corresponding actual measured value for each of the vibration and operating parameters; and determining whether differences between the predicted and actual measured values for one or more of the predetermined number of vibration and operating parameters exceeds a configured statistical limit using numerical methods.

DETAILED DESCRIPTION

Figure 1:
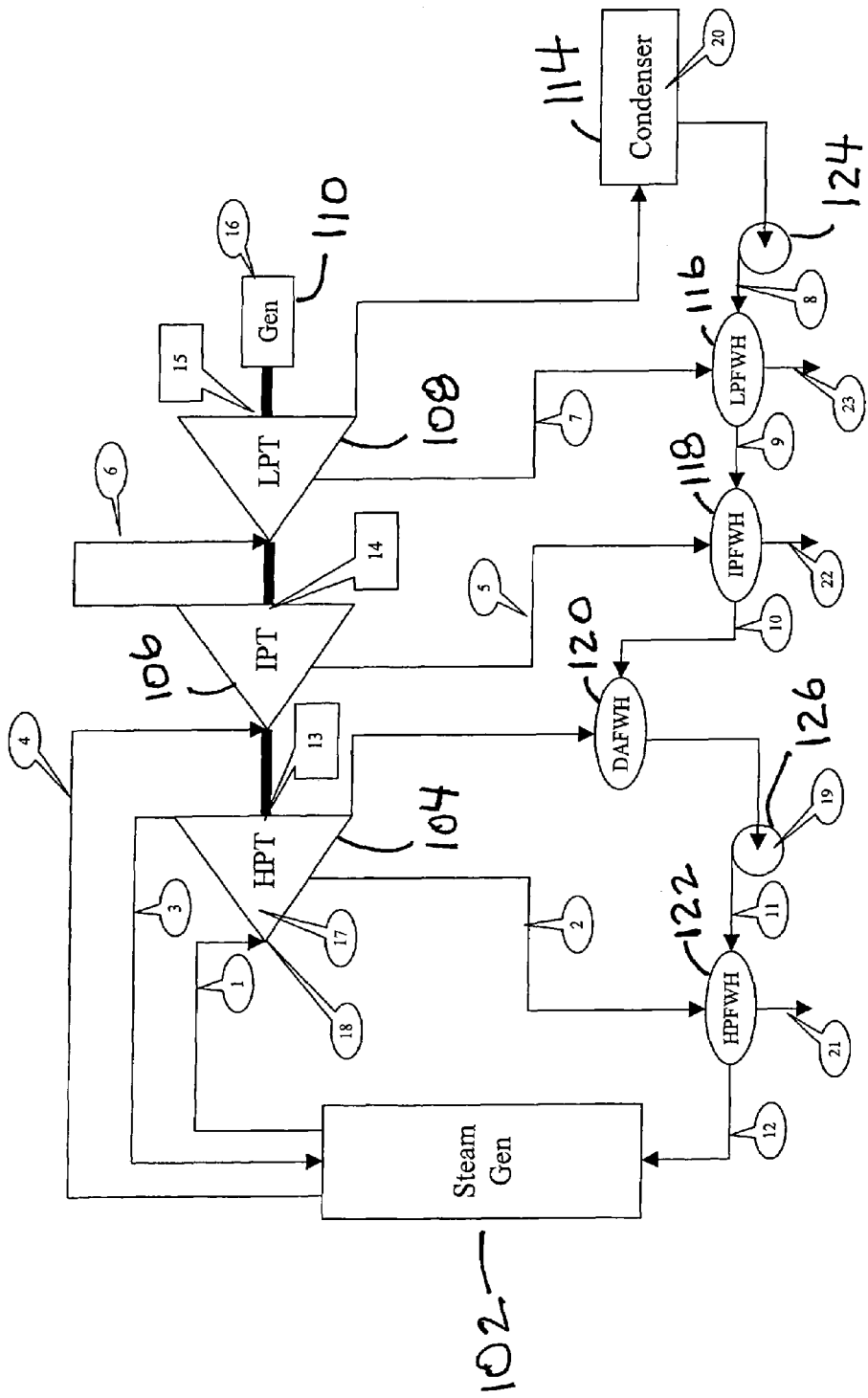
FIG. 1 shows a diagram of a water/steam side process of a boiler/turbine power cycle.

Referring now to FIG. 1, there is shown a diagram of a process 100 which is the water/steam side of a boiler/turbine power cycle. As is well known to those of ordinary skill in the art, the water/steam side process 100 includes a steam generator 102, a high pressure turbine 104, an intermediate pressure turbine 106, a low pressure turbine 108, a generator 110, a condenser 114, a low pressure feedwater heater 116, an intermediate pressure feedwater heater 118, a de-aerator feedwater heater 120, a high pressure feedwater heater 122, a condensate pump 124 and a boiler feed pump 126. While only one low pressure feedwater heater 116, one intermediate pressure feedwater heater 118 and one high pressure feedwater heater 122 are shown in FIG. 1, it should be appreciated that there are usually multiple heaters 116, 118 and 122 and that one heater is shown in FIG. 1 solely for convenience of illustration. It should also be appreciated that in some plants, heater 118 is located between heater 122 and boiler feed pump 126.

There is also associated with process 100 several types of sensors such as pressure sensors, temperature sensors, flow sensors and vibration or miscellaneous sensors. One or more of these sensors are at the measurement locations 1 to 23 in process 100. The table below shows which of the sensors are typically at each of the locations 1 to 23.

| Measurement Location | | Pres. | Sensor Temp. | Type Flow | Vibration Or Misc |
|---|---|---|---|---|---|
| 1 | Main Steam | X | X | | |
| 2 | HP Extraction Steam (1 to 4) | X | X | | |
| 3 | Cold Reheat Steam | X | X | | |
| 4 | Hot Reheat Steam | X | X | | |
| 5 | IP Turbine Extraction (1 to 4) | X | X | | |
| 6 | IP to LP Turbine crossover | X | X | | |
| 7 | LP Turbine Extraction (1 to 4) | X | X | | |
| 8 | LP FW Heater Inlet (1 to 8) | X | X | X | |
| 9 | LP FW Heater Outlet (1 to 8) | | X | | |
| 10 | IP FW Heater Outlet (1 to 8) | | X | | |
| 11 | HP FW Heater Inlet (1 to 8) | | X | | |
| 12 | HPFWH Outlet (1 to 8)/Feedwater | X | X | X | |

-continued

| Measurement Location | | Pres. | Sensor Temp. | Type Flow | Vibration Or Misc |
|---|---|---|---|---|---|
| 13 | HP Turbine Bearings | | X | | X |
| 14 | IP Turbine Bearings | | X | | X |
| 15 | LP Turbine Bearings | | X | | X |
| 16 | Generator | | | | X |
| 17 | HP Turbine 1$^{st}$ Stage | X | | | |
| 18 | HP Turbine Seals | | | X | |
| 19 | Boiler Feed Pump (1 to 3) | | | | X |
| 20 | Condenser | X | | | |
| 21 | HP FW Heater Drains (1 to 8) | | X | | |
| 22 | IP FW Heater Drains (1 to 8) | | X | | |
| 23 | LP FW Heater Drains (1 to 8) | | X | | |

In process 100, steam generator 102 generates high pressure steam. The high pressure steam, augmented by main steam spray, is fed to the high pressure turbine 104. Expanded steam from the high pressure turbine 104 is fed back to the steam generator 102 where it is reheated. The reheated steam, augmented by reheat spray, is fed to intermediate pressure turbine 106 and through that turbine to low pressure turbine 108. The steam from the low pressure turbine 108 is fed to condenser 114 where it is condensed into water.

The water from condenser 114 flows through condensate pump 124 into the low pressure feedwater heater 116. Extraction steam from the low pressure turbine 108 is also fed into heater 116. The heated water from low pressure feedwater heater 116 is fed into intermediate pressure feedwater heater 118 which also receives extraction steam from intermediate pressure turbine 106. The heated water from intermediate pressure feedwater heater 118 is fed to de-aerator feedwater heater 120 which also receives water from high pressure turbine 104. The heated water from de-aerator feedwater heater 120 flows through a boiler feed pump 126 into high pressure feedwater heater 122. The heater 122 also receives water from high pressure turbine 104. The heated water from heater 122 flows to steam generator 102.

The present invention uses a steady state predictive model of the machinery, such as for example the rotating equipment in the form of high pressure, medium pressure and low pressure turbines 104, 106 and 108, respectively, and boiler feed pump 126 of FIG. 1 of process 100 to detect the onset of mechanical problems in the machinery. There are numerous methods to build such a model for well-behaved machinery such as those shown in FIG. 1 for process 100. Several of these methods are:

1. First principles models—these can work well, but are expensive to build, and time consuming to calibrate to existing wear and tear conditions. Also, they tend to be intolerant of sensor drift or sensor failures and it is almost impossible to model vibration parameters using these models.

2. Neural network empirical models—these models are an improvement to the first principles models because they automatically factor in current wear and tear conditions. However, they are very time consuming to build, and are not tolerant of subsequent sensor drifts, failures, or input sets completely outside of the training range, as might be encountered during a failure that was not previously experienced.

3. Advanced Pattern Recognition empirical models also automatically factor in current wear and tear conditions. They have the added advantages of being quick and easy to build and are very tolerant of multiple sensor failures or drifting, or input sets completely outside of the training range, as might be encountered during a failure that was not previously experienced.

The Advanced Pattern Recognition (APR) technology, as is described below, is used in one embodiment of the present invention to construct a model of the machinery such as for example the rotating equipment in the form of high pressure, medium pressure and low pressure turbines 104, 106 and 108, respectively, and boiler feed pump 126 shown in FIG. 1 for process 100. It should be appreciated that other techniques, including but not limited to the other methods described above, can also be used to construct models for use with the present invention. As is described in more detail below in connection with FIG. 2, after the APR model is constructed it is deployed in real time. One example of a software product that can be used to generate the APR model is the software, known as Optimax On-Target, available from the assignee of the present invention as of the earliest claimed filing date for this application.

Although there is no practical upper limit on the number, the APR model can employ, for example, between 25 and 50 measured parameters (flows, temperatures, pressures, etc) of process 100, roughly an equal number of vibration parameters, and often times special parameters associated with a particular type of rotating equipment used in process 100. The exact number of measured process parameters used in a particular APR model is a function of the plant (e.g. the number of feedwater heaters, the number of turbine extraction points, the number of boiler feed pumps, etc.) and the instrumentation that is available in the plant.

It is common practice to locate vibration probes in several locations and axes on large or process critical rotating devices. The resulting spectra (one to three per probe depending on the manufacturer of the probe) can be decomposed in process real time into elements for further analysis. These elements then become inputs to the APR model. Some of these elements include items such as amplitude, phase angle, eccentricity, and relative gap in the three orthogonal directions. These elements typically are measured both at frequencies that are specific multiples of shaft rotational speed and at frequencies that are not exact multiples of shaft rotational speed, and again in differing planes, that is, the three orthogonal directions, for each relative measurement location. Examples of the specialized parameter measurements, in the case of a large steam turbine, are, for example, case expansion, thrust, eccentricity, and differential expansion.

The exact number of process parameters and vibration elements and specialized parameter measurements is a function of the process being monitored, the specific mechanical device and the instrumentation that is available in a specific plant. If some of the measurements are not available, the model fidelity will suffer slightly, but the method still functions (although false alarms may be more prevalent). The process parameters within the APR model serve to determine the state of the process, while the vibration parameters and the specialized parameter measurements serve to observe the state of the equipment in reaction to the state of the process.

Figure 2:
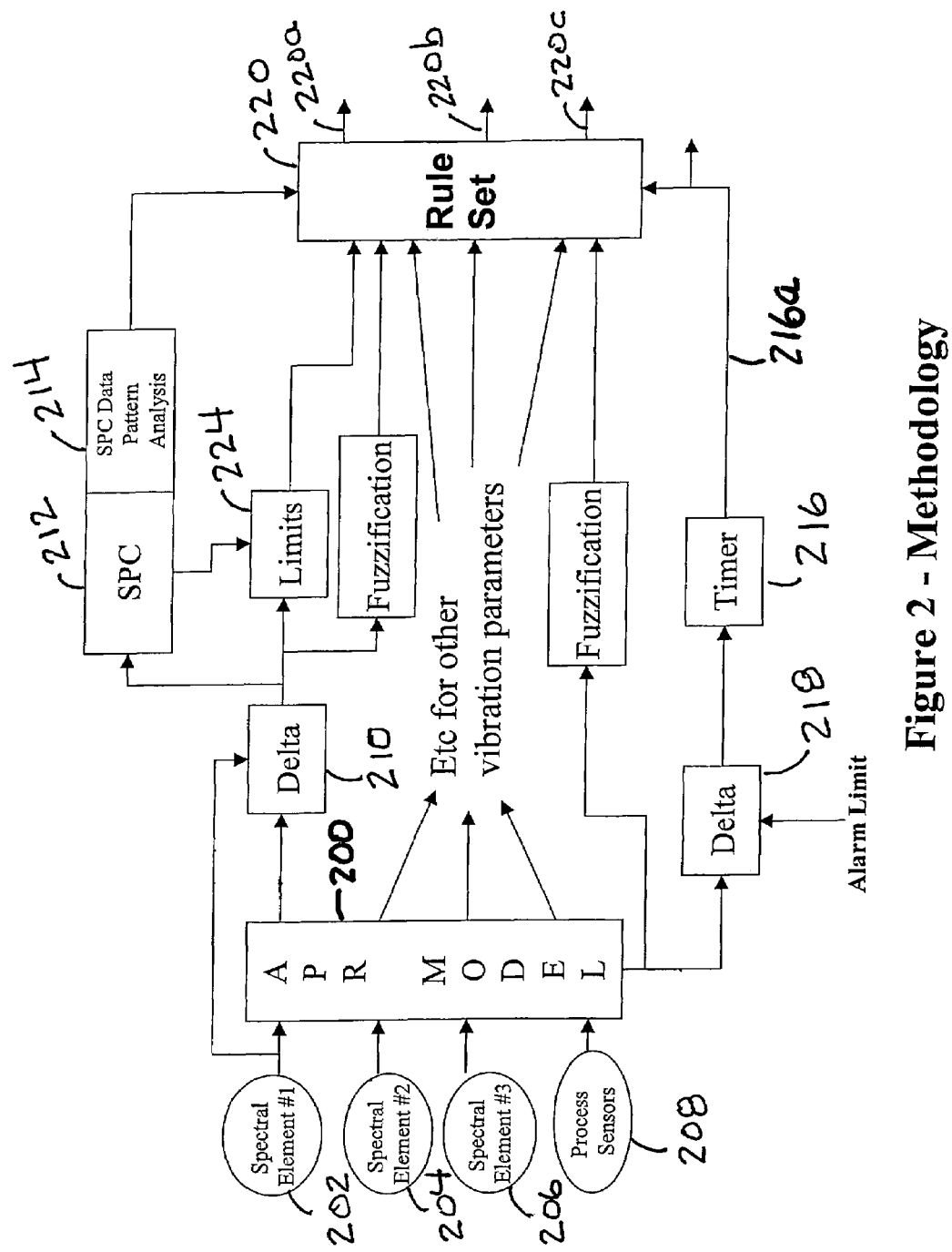
FIG. 2 shows a block diagram showing the real time deployment of the Advanced Pattern Recognition model of the process shown in FIG. 1.

Referring now to FIG. 2, there is shown the real time deployment of the APR model 200 of process 100. The inputs to the APR model 200 are those of the about 25 to about 50 vibration parameters, that are either measured or computed values, three of which are identified in FIG. 2 as "Spectral Element #1" 202, "Spectral Element #2" 204 and "Spectral Element #3" 206 and the about 25 to about 50 process parameters which are collectively identified in FIG. 2 as "Process Sensors" 208. By reading in the current value of the parameters 202, 204, 206 and 208, the APR model 200 generates expected (or model predicted) values for each of these input parameters.

The expected value for each of the parameters 202, 204, 206, 208 is compared to the actual measured value and the difference between the two values, known as the "DELTA", is determined. For ease of illustration, FIG. 2 shows only the calculation 210 of the DELTA between the expected value and the actual measured value for the Spectral Element #1 202 parameter. When the DELTA has a positive value, the actual measured value is greater than the expected value.

As is shown in FIG. 2 by block 212, statistical process control (SPC) methods can be applied to separate "normal" from "unusual" behavior for either a single point or groups of points. For ease of illustration, FIG. 2 shows only the SPC block 212 associated with the DELTA between the expected value and the actual measured value for the Spectral Element #1 202 parameter. In the case of a mechanical problem with machinery, for example, a problem with a bearing within boiler feed pump 126, it can be postulated that the DELTA for Spectral Elements 1, 2 and 3 and Process Sensors 202, 204, 206 and 208, respectively, should become "unusual" shortly after the start of a failure of a rolling element. Therefore SPC tools are applied to calculate standard deviations and test for exceeding the configured statistical limit.

The use of SPC methods in combination with the APR empirical model will under most system operating conditions alert the plant operator to the onset of a mechanical problem in the machinery. In the case of power generation units and numerous other processes, most units cycle load or throughput, at least on a daily basis, and perhaps more often and thus during load and other transients (e.g. coal pulverizer trip), it is possible that the DELTA values may become large enough to trigger a statistical limit. However, a persistence time factor can be added to the limit so that the alarm will not trigger until the DELTA values are statistically large in the positive direction continuously for a configurable period of time. This eliminates the transient effects.

As described above, the testing for statistical limits will alert the plant operator to the occurrence of gross bearing element failures, but most mechanical problems start out small and grow over time. In order to identify the onset of problems, the technique of the present invention can, as shown by block 214 of FIG. 2, apply SPC data pattern testing to the DELTA values. For ease of illustration, FIG. 2 shows only the block 214 for the SPC data pattern testing of the DELTA between the expected value and the actual measured value for the Spectral Element #1 202 parameter. The DELTA values can be tested for data patterns according to industry-accepted patterns, which may be the well known and accepted standard tests first developed by Western Electric, and/or patterns specifically created for use with the present invention or any combination of the industry standard and specially created patterns. The patterns are stored in block 214.

While there are many generally accepted pattern tests, of interest is one of "n" points in a row or "n" out of "m" points with a positive value. The values of "n" and "m" are established based upon the overall persistence time described above and the frequency of performing calculations in general. Another pattern test can be implemented for a sustained increasing trend (e.g. 5 out of 6 points in a row increasing) on the DELTA values.

Another parameter of great interest in determining the existence of a machine defect is the goodness of fit of the APR model 200 as a whole. All of the about 50 to about 100 Delta values are used by the APR Model 200 in calculating a "Model Fit" parameter which ranges between 0.0000 and 1.0000. The technique used by the APR Model 200 to calculate the Model Fit parameter is determined by the vendor of the software used to make the APR model 200. A model fit parameter of 1.0000 represents a perfect model, that is, all of the about 50 to about 100 prediction outputs exactly match their corresponding input values and all Deltas equal 0.00000. A model fit parameter of 0.0000 represents a model so imperfect that no individual output is statistically close to the actual measured parameter. In practice, a good model fit parameter is one that has a value of about 0.96 most of the time.

When an onset of a mechanical problem (or other significant plant anomaly) occurs, the fit of the model as a whole degrades because many measured parameters are influenced. Some, such as the three Spectral Elements, #1 202, #2 204 and #3 206, will vary to a large degree and others such as FW pressure, FW flow, bearing oil temperature etc. will vary to a lesser degree. This degradation will cause the overall model fit parameter to degrade to values such as 0.94 or less in a very short period of time. Again statistical pattern tests can be applied to the model fit parameter and the results of the statistical tests can be used in the malfunction rule set described below.

Of special interest are the Deltas for Spectral Element #1, #2 and #3 and Process Sensors 202, 204, 206 and 208, respectively, parameters. If a mechanical problem is present, one skilled in the art would expect the actual value of each of these four parameters to be greater than their respective model predicted values. Thus the method of the present invention compares each of these four Deltas to their respective three sigma limits to determine if the deviation is both positive and statistically large. For ease of illustration, FIG. 2 shows only the comparison 224 of the Delta for the Spectral Element #1 202 parameter.

If any three of the four parameters 202, 204, 206, 208 are beyond these statistically large limits for a period of time which is sufficient to remove transient measurement effects, then that is indicative of a gross mechanical element failure. The particular period of time is specific to the mechanical equipment and the system in which that equipment is used. During commissioning of the present invention, the time period is adjusted until the number of false or nuisance alarms due to load transients and other plant disturbances are considered by the plant operating personnel to be tolerable.

Again, if three of the four Deltas for the parameters 202, 204, 206, 208 exhibit sustained periods of time where Delta values are slightly positive, that is, the actual value is greater than the predicted value, a mechanical failure is probable. Finally, if one of the Deltas for the parameters 202, 204, 206, 208 matches one of the patterns and the model fit parameter is less than a predetermined value for a predetermined period of time, this is indicative that an onset of a mechanical problem may be present.

All of the above tests are embodied in a rotating equipment problem detection rule set 220 within the software, and the rule set causes appropriate alarms or messages to be sent if true. The output of rule set 220 may, for example, be a significant problem is probable at 220*a*, a potential for a problem exists at 220*b* or there are other faults at 220*c*.

While development of such a rule set is well within the capability of those of ordinary of the art, one example of such a rotating equipment problem detection rule set is given below for a motor driven startup boiler feed pump. As is well known the motor and boiler feed pump each have a set of bearings on each side of their shaft and the shafts of the motor and pump are coupled together.

In operation the startup boiler feed pump runs at a predetermined speed such as for example 1800 rpm. Vibration probes are mounted near each set of bearings and the probes in combination with their associated software provide the vibration amplitude for whole number multiples starting with one and ending with a predetermined number such as ten times of the pump shaft rotational speed. These multiples are referred to below as 1X, 2X . . . NX where N is a whole number starting with one. The probes in combination with their associated software also provide the vibration amplitude for not at a whole number multiple of the pump shaft rotational speed, which is referred to below as not 1X. The vibration amplitude is provided in the three directions, namely, radial (up/down), radial (in/out) and axial (left/right). The process parameters of interest are, for example:

pump flow;

pump discharge pressure and temperature;

bearing temperatures; and if applicable the temperature of the bearing cooling medium, for example water or oil.

The rule set for this example is:

If the mechanical problem is a bearing element failure, expect a normal 1X, 2X . . . NX but an abnormal not 1X in the radial direction because the frequency will be a function of the number of rollers in the bearing.

If the mechanical problem is an imbalance in the shaft expect that 1X radial will be abnormal.

If the mechanical problem is a misalignment in the shaft expect that 1X, 2X radial and axial will be abnormal.

If the mechanical problem is inside the pump, for example, an impeller problem, except that not 1X will be abnormal because the frequency will be a function of the number of impeller vanes and not of the pump shaft rotational speed.

There may be occurrences in a component of process 100 for which no rule sets have yet been written, that is, something unusual in the component. Timer 216 and Delta 218, shown in FIG. 2, are used to alarm those unusual occurrences and timer 216 provides an output 216*a* which is an indication that there is something unusual in the process and that indication is provided as an input to rule set 220 and as an output available to plant operating personnel.

Not shown in FIG. 2 is the method of decomposing vibration sensor spectral data into elements in process real time. Numerous commercial products exist for achieving this function. The invention accepts the plethora of vibration parameters directly.

As an individual piece of rotating equipment degrades, its vibration signature (spectra from individual vibration sensors) changes. However, the vibration signature also changes due to changes in the process itself. Since the APR model 200 contains information about both the process and the vibration signature, it is possible to differentiate between the two. Thus if the model fit is good under normal conditions, statistically large Deltas in individual vibration elements that persist become precursors to mechanical problems far sooner than by detection by any other means because the alarm thresholds can be set lower.

The method of the present invention employs classic fuzzy math methods 226*a* (again for ease of illustration only one fuzzy math box 226*a* is shown for the parameters 202, 204, 206 and 208) and 226*b* to quantify the degree of deviation. In turn, these values plus similar values for the model fit parameter are combined in rule set 220 to detect if the equipment is operating normally or in an unusual manner, and with what certainty.

The first step in building the empirical model 200 of process 100 is to assemble normal operational data from a plant historian for about 50–100 parameters covering about 30 days of operation. These days can be selected to give the model 200 as wide a spectrum of normal operations as practical, e.g. different loads, different ambient conditions, different numbers of auxiliaries in operation, etc. Since the model 200 is a steady state model, the data need not be in clock/calendar sequence. The data collection frequency can be anywhere from every 5 minutes to every 15 minutes. At the same time, a second set of historical data covering the same data tags should be assembled from different calendar dates to validate the model 200 after it is constructed.

The APR model generation software used in the embodiment described herein is the Optimax On-Target software. That software connects to any brand of distributed control system (DCS) or historian, and includes tools to review the raw data and quickly discard any records with missing data or obvious outliers. Caution should be taken to retain records covering normal excursions and operational modes (e.g. pump is in service) while eliminating records covering unusual excursions (e.g. load runback due to trip of the forced draft fan). Usually data below 30% unit load is ignored, unless the goal of the model is to detect failures occurring during startup or shutdown.

The second step is to eliminate duplicate (or very similar) records. Again, the APR model generation software should, as does the APR model generation software used in this embodiment, contain tools to simplify removal of such records. In this manner, thousands of data records can be reduced to less than 500 records in a matter of seconds.

The third step is to construct the model 200 from the training set, that is, the assembled normal operational data. The nature of Advanced Pattern Recognition technology allows a current generation PC to accomplish this task in less than 30 seconds which is far less time by many orders of magnitude than any other technology such as, for example, neural networks or multiple non-linear regression.

The fourth step is to validate the model 200 by using the model to predict values for a second or validation data set collected during the first step. For the embodiment described herein, the validation data set is actual plant data that contains about three weeks of data and includes a known mechanical failure occurrence that began some time during the three weeks of data in the records.

To implement the Statistical Process Control aspects of the present invention, the commercial off the shelf Optimax Performance software package available from the assignee of the present invention as of the earliest claimed filing date of this patent application was selected, primarily for its tight integration with the On-Target Advanced Pattern Recognition software. Alarm limits with appropriate persistence levels are selected for the Spectral Element #1, #2 and #3 and Process Sensors DELTAs to detect the gross mechanical element failures. The data pattern tests described earlier are activated for the same variables. The Optimax Performance software also includes the tools to implement the rules governing the triggers for the detection of the onset of a mechanical problem.

Figure 3:
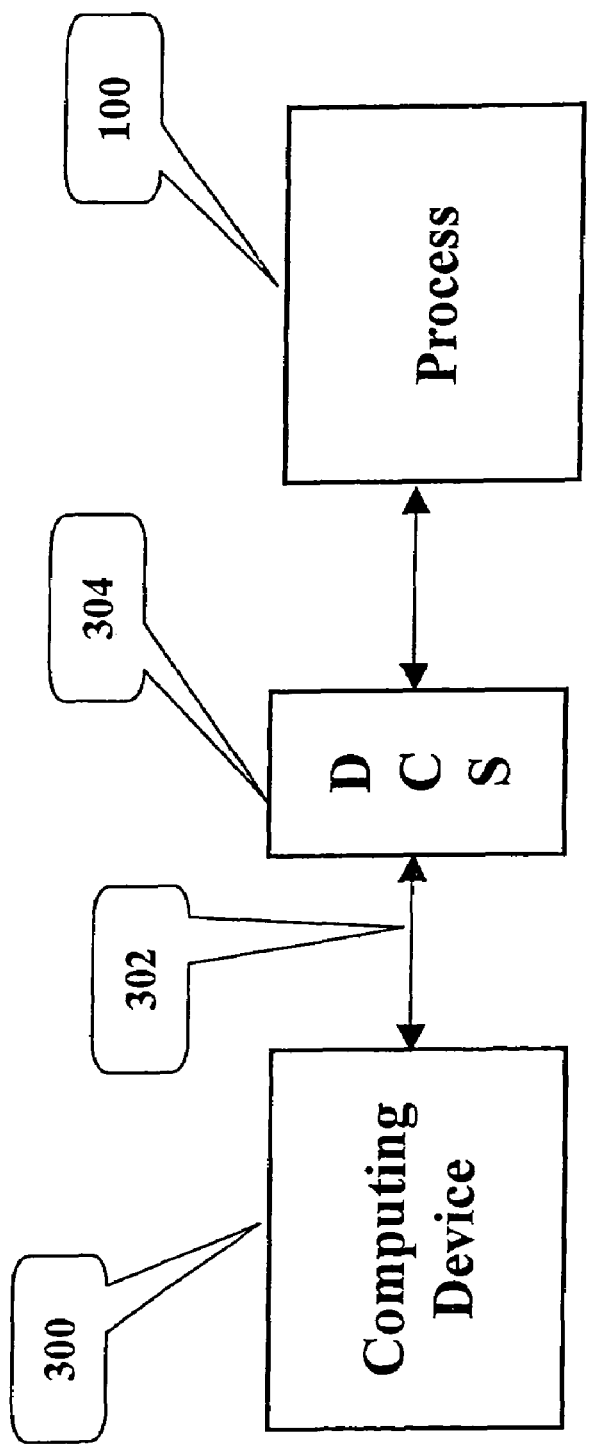
FIG. 3 is a block diagram showing a system including a computing device which may be used to implement the present invention.

The present invention may, as is shown in FIG. 3, be implemented in the form of a software program that runs on a computing device 300 that is connected to a process, which may for example be the process 100 of FIG. 1, by a data highway 302 and a distributed control system (DCS) 304. The data highway 302 has the capacity to interface with the sensors at measurement locations 1 to 23 of FIG. 1. The computing device 300, may for example, be any suitably arranged device such as a desktop PC that is capable of executing the program. The program may be a series of instructions on a suitable media such as a CD-ROM and computing device 300 has a suitable device such as the well known CDRW drive for receiving the CD-ROM so that the program can be read from the CD-ROM and loaded into device 300 for execution and if desired stored in a storage media such as a hard drive which is part of device 300.

While the embodiment described herein for the present invention uses an APR empirical model, it should be appreciated that other empirical model methods such as neural networks or multiple non-linear regression can also be used in the present invention. It should also be appreciated that while the present invention is described herein in connection with machinery that is a rotating device in the form of a steam driven turbine generator set for the production of electricity, the invention applies equally to any rotating device that is part of an industrial process (e.g. motors used to rotate rollers in papermaking machines or steel mill rollers, electrical motors attached to fans or pumps, gas turbine generator sets, pulp mill refiners, rotating crushers and pulverizers, compressors, diesel generator sets in locomotives, steam turbines and/or diesel generator sets in ships, etc).

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for detecting a fault in a machine used in a process, comprising:
    developing a model of said process;
    generating predicted values for a predetermined number of operating parameters of said process and a predetermined number of vibration parameters of said machine using said model;
    comparing the value predicted by said model for each of said predetermined number of vibration and operating parameters to a corresponding actual measured value for each of said vibration and operating parameters;
    calculating a model fit parameter from differences between said predicted and actual measured values for said predetermined number of vibration and operating parameters;
    applying a numerical method to said model fit parameter and said differences between said predicted and actual measured values to determine if there is an abnormal condition; and
    generating an operator notification if an abnormal condition is determined.

2. The method of claim 1 wherein said numerical method is a Statistical Process Control (SPC) method that determines whether said model fit parameter and said differences meet a predetermined SPC data pattern test.

3. The method of claim 2, wherein said operator notification indicates an onset of a mechanical problem when said model fit parameter is less than a predetermined value and one of said differences meets said predetermined SPC data pattern test.

4. The method of claim 1 wherein said predetermined number of operating parameters of said process depends on said process and said predetermined number of vibration parameters of said machine depends upon said machine.

5. The method of claim 1 wherein said difference for selected ones of said predetermined vibration and operating parameters are each compared to an associated three sigma limit.

6. The method of claim 5 wherein said operator notification indicates:
    a gross failure of an element in a machine in said process when said deviation for any three of said vibration and operating parameters are positive and statistically large for a predetermined period of time; and
    a probability of a mechanical failure in a machine in said process when said deviation for any two of said vibration and operating parameters are slightly positive for a predetermined period of time.

7. A process plant comprising:
    a computing device for detecting a fault in a machine used in a process operating in said plant, said computing device for:
    developing a model of said process;
    generating predicted values for a predetermined number of operating parameters of said process and a predetermined number of vibration parameters of said machine using said model;
    comparing the value predicted by said model for each of said predetermined number of vibration and operating parameters to a corresponding actual measured value for each of said vibration and operating parameters; and
    calculating a model fit parameter from differences between said predicted and actual measured values for said predetermined number of vibration and operating parameters;
    applying a numerical method to said model fit parameter and said differences between said predicted and actual measured values to determine if there is an abnormal condition; and
    generating an operator notification if an abnormal condition is determined.

8. The process plant of claim 7 wherein said numerical method is a Statistical Process Control (SPC) method that determines whether said model fit parameter and said differences meet a predetermined SPC data pattern test.

9. The process plant of claim 8, wherein said operator notification indicates an onset of a mechanical problem when said model fit parameter is less than a predetermined value and one of said differences meets said predetermined SPC data pattern test.

10. The process plant of claim 7 wherein said computing device is also for comparing said difference for selected ones of said predetermined vibration and operating parameters to an associated three sigma limit.

11. A computer readable medium having instructions for performing a method for detecting a fault in a machine of a process operating in a plant, said instructions comprising:
developing a model of said process;
generating predicted values for a predetermined number of operating parameters of said process and for a predetermined number of vibration parameters of said machine using said model;
comparing the value predicted by said model for each of said predetermined number of vibration and operating parameters to a corresponding actual measured value for each of said vibration and operating parameters; and
calculating a model fit parameter from differences between said predicted and actual measured values for said predetermined number of vibration and operating parameters;
applying a numerical method to said model fit parameter and said differences between said predicted and actual measured values to determine if there is an abnormal condition; and
generating an operator notification if an abnormal condition is determined.

12. The computer readable medium of claim 11 wherein said numerical method is a Statistical Process Control (SPC) method that determines whether said model fit parameter and said differences meet a predetermined SPC data pattern test.

13. The computer readable medium of claim 12, wherein said operator notification indicates an onset of a mechanical problem when said model fit parameter is less than a predetermined value and one of said differences meets said predetermined SPC data pattern test.

14. The computer readable medium of claim 11 wherein said instructions further comprise comparing said difference for selected ones of said predetermined number of vibration and operating parameters to an associated three sigma limit.

15. An apparatus comprising:
a processing device for:
developing a model of a process;
generating predicted values for a predetermined number of operating parameters of said process and a predetermined number of vibration parameters of said machine using said model;
comparing the value predicted by said model for each of said predetermined number of vibration and operating parameters to a corresponding actual measured value for each of said vibration and operating parameters; and
calculating a model fit parameter from differences between said predicted and actual measured values for said predetermined number of vibration and operating parameters;
applying a numerical method to said model fit parameter and said differences between said predicted and actual measured values to determine if there is an abnormal condition; and
generating an operator notification if an abnormal condition is determined.

16. The apparatus of claim 15 wherein said numerical method is a Statistical Process Control (SPC) method that determines whether said model fit parameter and said differences meet a predetermined SPC data pattern test.

17. The apparatus of claim 16, wherein said operator notification indicates an onset of a mechanical problem when said model fit parameter is less than a predetermined value and one of said differences meets said predetermined SPC data pattern test.

18. The computer readable medium of claim 15 wherein said processing device is also for comparing said difference for selected ones of said predetermined vibration and operating parameters to an associated three sigma limit.

* * * * *